United States Patent [19]
Matievich et al.

[11] 3,777,358
[45] Dec. 11, 1973

[54] METHOD OF ASSEMBLYING A RETAINED FASTENER ASSEMBLY

[75] Inventors: William Matievich, Hatboro, Pa.; Harry A. Theakston, Tustin, Calif.

[73] Assignee: Standard Pressed Steel Co., Jenkintown, Pa.

[22] Filed: Oct. 7, 1971

[21] Appl. No.: 187,538

Related U.S. Application Data
[62] Division of Ser. No. 46,073, June 15, 1970, abandoned.

[52] U.S. Cl............ 29/450, 29/453, 29/526, 29/235, 151/69, 287/189.36 F
[51] Int. Cl............................. B23p 11/02
[58] Field of Search............ 29/450, 453, 235, 29/229, 526; 151/69, 41.7; 287/189.36 F

[56]  References Cited
UNITED STATES PATENTS

| | | | |
|---|---|---|---|
| 1,970,078 | 8/1934 | Dillon | 151/69 X |
| 2,422,549 | 6/1947 | Hogin | 29/235 |
| 3,030,700 | 4/1962 | Jensen | 29/229 |
| 3,171,461 | 3/1965 | Zahodiakin | 151/41.7 X |
| 3,217,774 | 11/1965 | Pelochino | 151/69 |
| 3,221,794 | 12/1965 | Acres | 151/69 |
| 3,319,325 | 5/1967 | Nessamar et al. | 29/235 |
| 3,397,727 | 8/1968 | Orosz | 151/69 |
| 3,487,529 | 1/1970 | Serio | 29/235 |
| 3,604,096 | 9/1971 | Shiroma | 29/235 |

Primary Examiner—Charlie T. Moon
Attorney—Andrew L. Ney

[57]  ABSTRACT

A retained fastener assembly for use in securing a plurality of workpieces together comprises a screw having a groove configuration including a conical surface and a radial shoulder with a flat face formed intermediate the ends of the shank. The screw is attached to a panel by placing the sleeve of a tool over the threaded portion of the shank and sliding a retaining ring over the tool until it snaps into the groove configuration. Thereafter, the ring cooperates with the flat face on the shoulder and the panel to prevent removal of the screw from the panel from one direction while the head prevents removal from the other direction. To assemble a joint, the panel carrying the fastener is placed adjacent another panel or workpiece having an aperture and a nut; the screw is then pushed through the ring and inserted into the aperture and engaged with the nut.

2 Claims, 4 Drawing Figures

PATENTED DEC 11 1973 3,777,358

INVENTOR.
WILLIAM MATIEVICH
HARRY A. THEAKSTON
BY
*Robert Rutter*
ATTORNEY

METHOD OF ASSEMBLYING A RETAINED FASTENER ASSEMBLY

This is a continuation, division, of application Ser. No. 46,073 filed June 15, 1970, now abandoned.

Various structural joints, for example, access panels forming part of a housing for electronic, hydraulic or other equipment, are assembled and disassembled repeatedly so that the fasteners utilized to secure the joints must be capable of rapid removal and assembly in the joint. In these joints, it is common to utilize retained fastener assemblies, that is, fasteners that are carried by one of the panels or workpieces forming the joint and which are prevented from being disassembled from the panel. Thus, when the joint is disassembled, the fastener is retained with the panel and ready for assembly of the joint at a later time. It will be appreciated that in addition to facilitating the assembly and disassembly of joints, the use of retained fastener assemblies keeps the fastener from being lost and allows for the repeated use thereof.

The retained fastener assemblies that are presently available suffer from various drawbacks that do not make them entirely satisfactory. For example, these assemblies usually include a retaining ring that grips the fastener at the end adjacent the thread so that as the fastener is inserted into the joint, the thread is forced through the retaining ring which may damage or mar the thread so that assembly or disassembly of the joint is difficult. In addition, some of these assemblies merely resist, rather than positively prevent, the removal of the fastener from the panel so that sufficiently high external loads may allow the fastener to become disassembled from the panel.

It is an object of this invention, therefore, to provide a retained panel fastener assembly that positively retains the fastener in the panel and is economical to make.

It is yet another object of this invention to provide a retained panel fastener assembly that allows for the assembly of a joint without damaging the thread on the fastener.

It is still another object of this invention to provide a tool and method for assembling a fastener in a panel so that the thread on the fastener is not damaged.

These and other objects of this invention are accomplished by providing a screw including a shank having a threaded portion adjacent one end and a head formed at the other end. Intermediate the ends of the shank, preferably adjacent the threaded portion, is a groove configuration having a radial shoulder with a flat face and a conical surface tapering outwardly from the shoulder toward the head end of the shank. The screw is inserted into an aperture in a workpiece with the groove configuration projecting beyond the end of the workpiece and, thereafter, the sleeve of a tool is placed over the threaded portion of the shank and a resilient retaining ring is moved along the tool until it snaps into the groove configuration on the shank where it cooperates with the flat face of the shoulder and the end of the workpiece to retain the screw in the panel. To assemble a joint, the workpiece carrying the screw is placed adjacent another workpiece with an aligned aperture and a nut; the screw is then pushed axially into the aperture in the other workpiece and into engagement with the nut during which time the retaining ring expands over the conical surface of the groove configuration and slides along the shank.

For a better understanding of the present invention, together with other and further objects thereof, reference is made to the following description, taken in connection with the accompanying drawing, and its scope will be pointed out in the appended claims.

Referring to the drawing.

Figure 1:
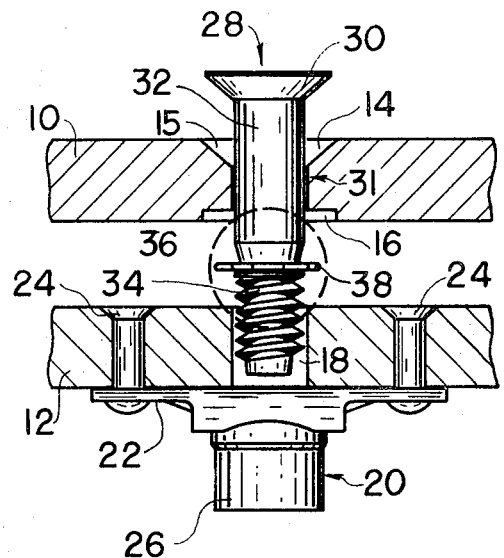
FIG. 1 is a view partly in section of a joint prior to assembly with the retained fastener assembly of this invention.
Figure 2:
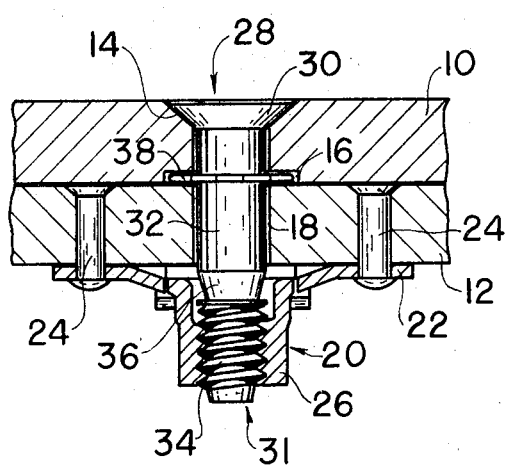
FIG. 2 is a view partly in section of a joint assembled with the retained fastener assembly of this invention.

In FIGS. 1 and 2 of the drawing, there is illustrated a pair of panels 10 and 12 to be assembled together in face-to-face relationship to form a joint Panel 10 includes an aperture 14 extending therethrough and having a countersink 15 formed at one end face and a counterbore 16 formed at the other end face. Panel 12 includes an aperture 18 and carries a plate nut assembly 20 which is secured to one end face of the panel by a flange 22 which cooperates with fasteners 24. Extending downwardly from flange 22 and in axial alignment with aperture 18 is a threaded nut member 26 which may be rigidly secured to flange 22 or which may be secured to the flange for limited axial and radial movement to compensate for slight dimensional variations between the bore of the nut and the aperture in the panel. Of course, it should be understood that various other types of nut assemblies may be utilized with panel 12 as long as a threaded bore is provided.

Received in aperture 14 in panel 10 is a screw 28 that includes a head 30 of the flush-fitting type and a shank 31 having a smooth or unthreaded portion 32 and a threaded portion 34. Threaded portion 34 cooperates with nut member 26 to exert a clamp load between panels 10 and 12 and retain them in assembled relationship. Formed intermediate the ends of shank 31 at a point beyond the counterbored end face of the panel when head 30 seats in countersink 15 is a groove configuration 36 that cooperates with a radially expandable retaining ring 38 to prevent withdrawal of the screw from aperture 14. In the embodiment disclosed herein, retaining ring 38 is a split ring including a plurality of outwardly and inwardly curved resilient portions.

Figure 3:
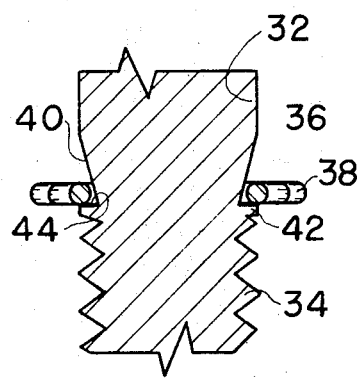
FIG. 3 is an enlarged view in section of the encircled portion of FIG. 1.

As best seen in FIG. 3, groove configuration 36 includes a conical surface 40 having its largest cross-section dimension located adjacent smooth portion 32 of the shank and its smallest cross-section dimension located adjacent threaded portion 34 of the shank. The diameter of the smallest cross-section of conical surface 40 is such that a radial shoulder 42 is formed by the innermost convolution of threaded portion 34. It is to be understood, however, that the groove configuration could be located closer to head 30 so that the smallest cross-section of conical surface 40 and shoulder 42 are spaced from threaded portion 34 by a smooth portion of the shank. In the embodiment disclosed herein, the diameter of the smallest cross-section of conical surface 40 is equal to the minor diameter of the threaded portion 34 so that the strength of the screw is not weakened and so that a shoulder of substantial width is provided. To assure that retaining ring 38 cannot expand outwardly to allow passage of the threads and removal of the screw, shoulder 42 has a flat face 44 against which ring 38 bears.

Figure 4:
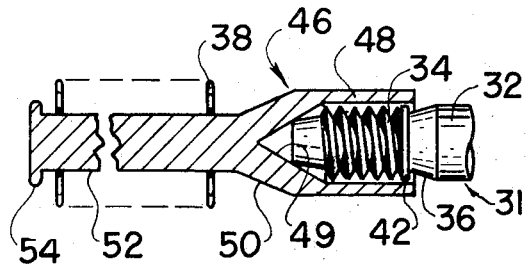
FIG. 4 is a view in section of a tool used to assemble the retained fastener assembly of this invention.

Referring to FIG. 4, a tool 46 is illustrated that allows the positioning of retaining ring 38 in groove 36 without damaging threaded portion 34 of the shank. Tool 46 comprises a cylindrical sleeve which is closed at one end and has an inner diameter slightly larger than the major diameter of threaded portion 34 of the shank so that the threaded portion may be received in the sleeve. The axial length of the sleeve is equal to the distance between the point end of the shank and shoulder 42 so that all of the threaded portion is enclosed by the sleeve and so that the ring may be expanded over the shoulder. The closed end of sleeve 48 is formed by a conical inner wall 49 to provide a bearing surface for the point end of the screw when the shank is placed on the sleeve. Since inner wall 49 is conical, variations in the diameter of the point end of the screw are accommodated and the screw will be fully seated on the inner wall and will not cock to tilt in the tool. A conical outer surface 50 tapers inwardly from the outer surface of the closed end of sleeve 48 and extends to a cylindrical shank portion 52 on which is carried one or more retaining rings 38. By mounting a plurality of rings 38 on shank 52, the tool can be utilized as a packaging system for shipping and storing the rings. When the tool is used as a packaging system, a knob 54 is formed on the end of shank portion 52 to retain the rings on the tool. To install the screw 28 in panel 10, the shank 31 is inserted in aperture 14 so that groove configuration 36 extends beyond the end of the aperture. Sleeve 48 of the tool is placed over threaded portion 34 of the shank until the point end of the shank bears on inner wall 49 and the free end of the sleeve is adjacent shoulder 42; thereafter, a retaining ring 38, carried on shank 52, is moved along and expanded over conical surface 50 and moved along the outer surface of sleeve 48 until it snaps into groove configuration 36. The tool is then removed and used to install another ring on another screw.

When ring 38 is assembled in groove configuration 36, removal of the screw by pulling upwardly on head 30 is prevented by the ring bearing on flat face 44 of shoulder 42 and on the bottom of counterbore 16. Of course, head 30 prevents removal of the screw in the downward direction and, thus, the screw is retained in the panel.

To assemble the joint, panels 10 and 12 are placed adjacent each other with apertures 14 and 18 in alignment and, thereafter, screw 28 is pushed axially into aperture 18 in panel 12. During the axial movement of the screw, retaining ring 38 will engage the inner surface of panel 12 and will be expanded over conical surface 40 and along smooth shank portion 32 until it eventually seats in counterbore 16 on panel 10. It can be seen that during assembly of the joint the ring does not engage the threaded portion and, accordingly, cannot damage the thread. When screw 28 engages nut member 26, the screw is rotated into threaded engagement with the nut member until clamp-up of the panels is achieved.

To disassemble the joint, screw 28 is rotated into disassembled relationship with nut member 26 and pushed axially away from panel 12 so that retaining ring 38 slides along smooth shank portion 32 and conical surface 40 until it bears against flat face 44 of shoulder 42. Thereafter, retaining ring 38 prevents withdrawal of the screw through aperture 14 in panel 10 by bearing against flat face 44 of shoulder 42 and the bottom surface of counterbore 16.

From the preceeding description of a preferred embodiment of the invention, it should be clear that the fastener can be readily assembled to a panel without damage to the threads of the fastener and that the fastener is positively retained in the panel. Moreover, it should be clear that the threads of the fastener cannot be damaged by the retaining ring during assembly and disassembly of the joint.

While there has been described what is at present considered to be a preferred embodiment of this invention, it will be obvious to those skilled in the art that various changes and modifications may be made therein without departing from the invention and it is, therefore, aimed to cover such changes and modifications as fall within the true spirit and scope of the invention.

What is claimed is:

1. A method of retaining a screw in a panel comprising: providing a panel having a pair of outer surfaces and an opening extending from one of said surfaces through to the other of said surfaces;

providing a screw having a head portion and a shank extending therefrom, said shank being formed with thread convolutions extending from a point adjacent its free end and terminating at a point intermediate said head portion and said free end, said shank being further formed with a groove adjacent the termination point of said thread convolutions;

inserting said shank through said opening in said panel so that said head portion is adjacent said one surface of said panel and said groove and said threads extend beyond said other surface of said panel;

providing a tool having a first cylindrical portion having an opening formed by a generally smooth cylindrical wall extending from a free face thereof a distance substantially equal to the extent said thread convolutions on said shank and terminating in an end bearing wall, said tool being further provided with a second cylindrical portion having a diameter smaller than that of said first cylindrical portion, said first and second cylindrical portions being connected by a conical portion, and having at least one retaining ring carried thereon; and, placing said opening in said tool over said thread convolutions on said shank so that the free end of said shank bears on said end wall of said opening and said cylindrical portion covers said threads with the free face of said tool adjacent said groove, sliding said retaining ring along said second cylindrical portion and said conical portion of said tool, the diameter of said retaining ring increasing along said conical portion, and further sliding said retaining ring over said first cylindrical portion and beyond said free face of said first cylindrical portion so that said retaining ring snaps into said groove on said shank.

2. A method in accordance with claim 1 wherein said second cylindrical portion of said tool is provided with a plurality of said retaining rings.

* * * * *